June 18, 1940.      K. OLSEN      2,204,691
ANTIGLARE VISOR
Filed April 3, 1939      2 Sheets-Sheet 1

Kolbjörn Olsen
INVENTOR

BY M. Bjorndal
ATTORNEY

June 18, 1940.　　　　　K. OLSEN　　　　　2,204,691
ANTIGLARE VISOR
Filed April 3, 1939　　　　2 Sheets-Sheet 2
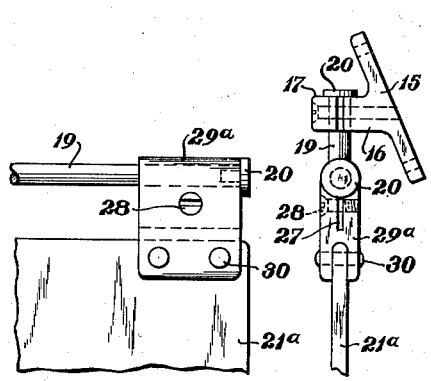
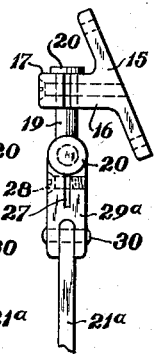
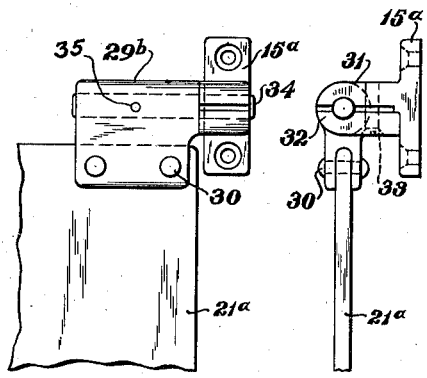
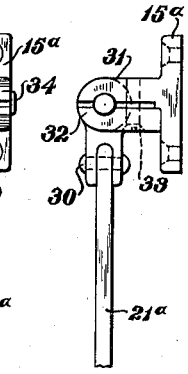
Fig. 5　　Fig. 6　　Fig. 7　　Fig. 8
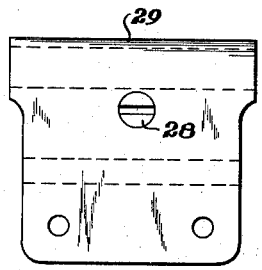
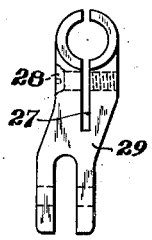
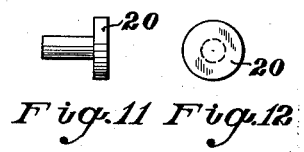
Fig. 9　　Fig. 10　　Fig. 11　Fig. 12
Kolbjörn Olsen
INVENTOR
BY M. Bjorndal
ATTORNEY Patented June 18, 1940

2,204,691

UNITED STATES PATENT OFFICE 2,204,691

ANTIGLARE VISOR

Kolbjorn Olsen, Brooklyn, N. Y.

Application April 3, 1939, Serial No. 265,618

3 Claims. (Cl. 296—97)

My invention relates to improvements in antiglare sun visors for automobiles and the mounting and operating mechanism of same.

Visors have been widely used to avoid the glare of the sun, however, what is equally important to safe driving is to avoid the glare of automobile headlights at night. The objection to the older types of visors is that they are non-transparent and therefore obstruct the view when used in the daytime, and they are totally useless for night driving. Attempts have been made to remedy this condition by the use of a single transparent visor, but this method had the disadvantage of being either too transparent in the daytime or not enough transparent at night. In the present invention this condition has been remedied by the use of two or more sheets of different transparency, usable one over the other, or singly to permit the necessary variation in transparency required for day and night driving. In addition to the above the method of constructing visors and fittings for same has been greatly improved.

An important object of the invention is to provide multiple layer, transparent visors with variable transparency for day and night driving.

A further object of the invention is to provide improved methods of constructing such visors and fittings for same.

Other objects and advantages of the invention will be apparent during the course of the following description.

In the accompanying drawings, forming part of this specification, and in which like numerals are employed to designate like parts throughout the same:

Figure 5 is a partial front elevation of a single visor with my improved fitting, Figure 6 is a side elevation of the visor shown in Fig. 5, Figure 7 is a partial front elevation of another modification of a visor with my improved fittings, Figure 8 is a side elevation of the visor shown in Fig. 7, Figures 9 and 10 are front and side views, respectively, of an improved visor fitting, and, Figures 11 and 12 are side and end views, respectively, of an end fitting.

Figure 1:
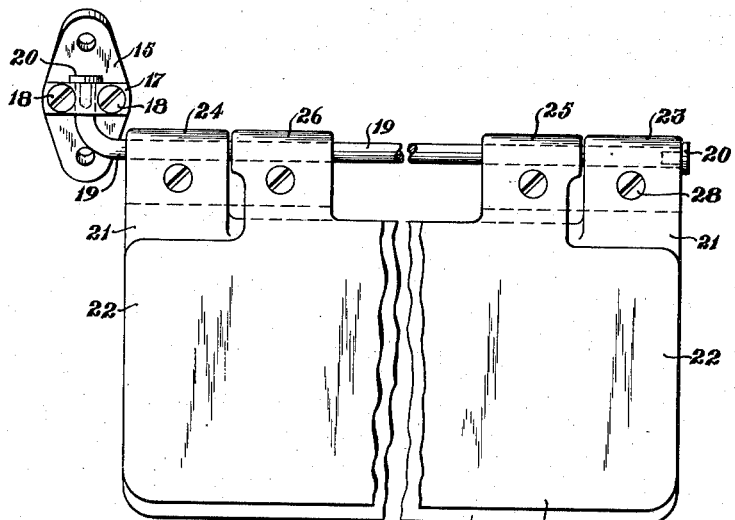
Figure 1 is a front elevation of a visor embodying my invention.
Figure 2:
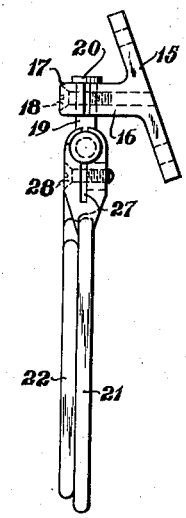
Figure 2 is a side elevation of the visor shown in Figure 1.

In the drawings, wherein for the purpose of illustration, are shown several preferred embodiments of my invention, the numeral 15 designates the mounting bracket, see Figs. 1, 2 and 6, by which the visor is mounted to the header above the windshield of an automobile. The bracket 15 is made with the mounting surface at a suitable angle so that the body portion 16 extends in a horizontal direction. A clamp 17 is fastened to the body portion 16 by the screws 18, and the upturned end of the visor supporting rod or arm 19 is held in a friction grip between 16 and 17 in a manner to permit the long horizontal arm of bar 19 to rotate about 90 degrees. Both ends of rod 19 are supplied with an endfitting 20 which consists of a rivet-like member driven into a suitable hole in the end of rod 19, see Figures 11 and 12.

Referring to Figures 1 and 2, the visor proper consists of two molded, transparent visor plates 21 and 22. Plate 21 is slightly longer than 22 to permit pulling down one or both plates at a time. It is obvious that it would be possible to use three or more plates in the same manner. Each plate is molded from a suitable plastic, but of different transparency. There are a number of transparent plastics suitable for this purpose such as "Crystalite," "Lucite," "Polystyrene," cellulose acetate, etc. In the visor shown in Figures 1 and 2 the front plate 21 would be only slightly colored, for use independently during night driving, while plate 22 would be of a considerably less transparent shade for use over plate 21 to shield against sun glare. The plate 21 is molded with two ears 23 and 24, one at each end, of a larger cross section. The plate 22 has similar ears 25 and 26 and both plates 21 and 22 have cut-away portions to clear the ears of the other. The ears 23, 24, 25 and 26 have a longitudinal hole fitting snugly over the rod 19 and longitudinal slots 27. Each ear has a screw 28 transverse to slots 27 whereby the tension of the ears may be adjusted, clamping same tightly to rod 19.

Figure 3:
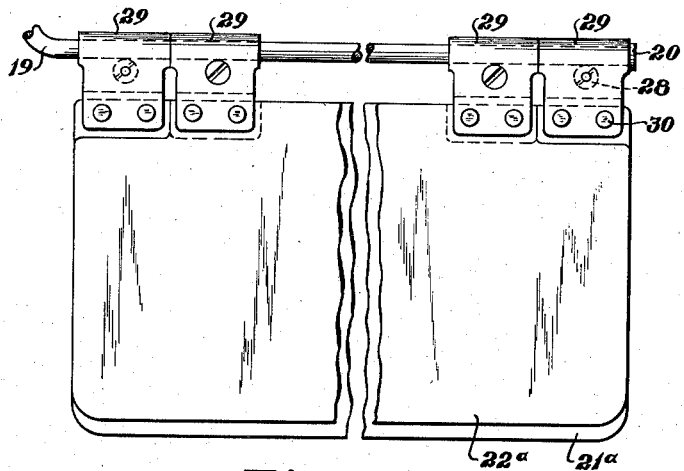
Figure 3 is a front elevation of another modification of a visor embodying my invention.
Figure 4:
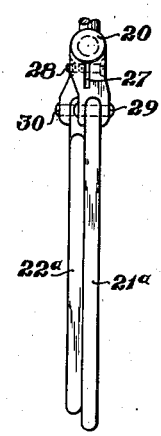
Figure 4 is a side elevation of the visor shown in Figure 3.

In Figures 3 and 4 is shown a visor similar to that described supra, with the difference, however, that instead of molded, transparent visor plates use has been made of plates of other transparent materials such as "Flexiglass," "Lucite," "Plastacele," glass or shatterproof glass or other suitable transparent material. With these materials it would not be possible to mold the ears corresponding to 23, 24, 25, and 26 in Figure 1. Die-cast clamps 29 are fastened to the visor plates 21a and 22a with rivets 30. The clamps 29 are all identical, but the two on plate 21a are reversed in reference to those on plate 22a. The plates 21a and 22a are cut in suitable portions to clear the clamps 29 on the other plate.

In Figures 5 and 6 is illustrated a straight clamp 29a which is similar to clamp 29 in Fig. 3 except that it is adopted for a single visor plate 21a.

Figures 7 and 8 represent a visor having two mounting brackets 15a. This visor can thus not be turned sidewise in 90 degrees such as those described supra. The bracket 15a consists of a body portion 31, a clamp portion 32 and a screw 33. The clamp 29b is fastened to the visor plate 21a with rivets 30. A short shaft 34 is fastened in clamp 29b with pin 35 and extends between bracket 31 and clamp 32.

Figures 9 and 10 show the details of the clamp 29 described supra in connection with Figures 3 and 4.

The operation of my invention is obvious from the description given supra. It is to be understood that the form of my invention, herewith shown and described, is to be taken as a preferred example of the same, and that various changes in the shape, size, materials, and arrangement of parts may be resorted to, without departing from the spirit of my invention, or the scope of the subjoined claims. It is also to be understood that polarized glass or any other suitable transparent material may be used in the visor plates or panels.

Having thus described my invention I claim:

1. An antiglare visor of the character described comprising a mounting bracket with a slanting base; a horizontal tab extending away from said mounting bracket and having a vertical, semi-cylindrical groove on its outside face; a clamp member having a vertical, semi-cylindrical groove corresponding and opposite to the groove in the said face of the horizontal tab; screw means for adjusting the clamp member to the horizontal tab of the mounting bracket; a cylindrical rod one end of which is bent at right angles, the shorter right angle part being pivoted in the groove between said clamp and horizontal tab of the mounting bracket, and a plurality of molded, semi-transparent visor plates rotatably mounted on the longer, horizontal part of said cylindrical rod.

2. An antiglare visor of the character described comprising a mounting bracket with a slanting base; a horizontal tab extending away from said base and having a vertical, semi-cylindrical groove on its outside face; a clamp member having a vertical, semi-cylindrical groove corresponding to, and opposite, to the groove in the face of the horizontal tab; screw means for adjusting the clamp member to the horizontal tab of the mounting bracket; a cylindrical rod one end of which is bent at right angles, the shorter right angle part being pivoted in the groove between said clamp and horizontal tab of the mounting bracket; a plurality of molded, semi-transparent visor plates, each plate having two projecting ears with friction bearing whereby said plates are rotatably mounted upon the longer horizontal part of said cylindrical rod, and screw adjustable means whereby said friction bearing may be tightened.

3. An antiglare visor of the character described comprising a mounting bracket with a slanting base; a horizontal tab extending from said base and having a vertical, semi-cylindrical groove on its outside face; a clamp member having a vertical, semi-cylindrical groove corresponding, and opposite, to the groove in the face of the horizontal tab; screw means for adjusting the clamp member to the horizontal tab of the mounting bracket; a cylindrical rod one end of which is bent at right angles, the shorter right angle part being pivoted vertically in the groove between said clamp and horizontal tab of the mounting bracket; a plurality of molded, semi-transparent visor plates, each plate being of a different transparency from the other, and each plate having projecting ears with adjustable friction bearings whereby said plates are rotatably mounted upon the longer horizontal part of said cylindrical rod, and screw adjustable means whereby bearings may be tightened.

KOLBJORN OLSEN.